United States Patent [19]

Ueda et al.

[11] Patent Number: 4,469,624

[45] Date of Patent: Sep. 4, 1984

[54] MAGNETIC COATING COMPOSITIONS FOR MAGNETIC RECORDING MATERIALS

[75] Inventors: Ikuo Ueda; Rikiya Kai, both of Miyazaki, Japan

[73] Assignee: Asahi Kasei Kogyo Kabushiki Kaisha, Osaka, Japan

[21] Appl. No.: 454,517

[22] Filed: Dec. 30, 1982

[30] Foreign Application Priority Data

May 20, 1982 [JP] Japan ................................ 57-83979

[51] Int. Cl.$^3$ .............................................. H01B 1/02
[52] U.S. Cl. ................................... 252/513; 252/511; 524/35; 524/440; 106/1.12; 106/193 M; 106/195
[58] Field of Search ........................ 252/513, 519, 511; 524/351, 440, 612, 435; 274/11 E; 358/102; 106/193 R, 1.12, 163 R, 168, 195, 193 M, 290, 304

[56] References Cited

U.S. PATENT DOCUMENTS

| | | | |
|---|---|---|---|
| 3,087,839 | 4/1963 | Fogle | 524/435 |
| 3,200,007 | 8/1965 | Flowers | 524/435 |
| 3,262,806 | 7/1966 | Gourge | 524/435 |
| 3,719,610 | 3/1973 | Prentice | 252/513 |
| 3,766,095 | 10/1973 | Mastrangelo | 252/513 |
| 3,830,656 | 8/1974 | Takenaka et al. | 252/511 |
| 3,989,644 | 11/1976 | Bolon et al. | 252/511 |
| 4,004,997 | 1/1977 | Tsukamoto et al. | 524/435 |
| 4,268,430 | 5/1981 | Suzuki et al. | 524/440 |

FOREIGN PATENT DOCUMENTS 2044789A 10/1980 United Kingdom .

*Primary Examiner*—Josephine Barr
*Attorney, Agent, or Firm*—Sughrue, Mion, Zinn, Macpeak & Seas

[57] ABSTRACT

A magnetic coating composition for use in the production of a magnetic recording material is described. The composition is comprised of at least ferromagnetic metal powder and/or ferromagnetic alloy powder and nitrocellulose having an average degree of polymerization of from 10 to 55, or at least ferromagnetic metal powder and/or ferromagnetic alloy powder, nitrocellulose having an average degree of polymerization of from 10 to 55, and at least one polymeric binder. This magnetic coating composition has excellent dispersibility of the magnetic powder, and can provide a magnetic recording material which has excellent surface smoothness and orientation ratio, as well as excellent durability.

10 Claims, No Drawings

MAGNETIC COATING COMPOSITIONS FOR MAGNETIC RECORDING MATERIALS

FIELD OF THE INVENTION

The present invention relates to magnetic coating compositions for magnetic recording materials. More particularly, the invention relates to magnetic coating compositions capable of producing magnetic recording materials containing ferromagnetic metal powder and/or ferromagnetic alloy powder and having excellent dispersibility of the powder and durability.

BACKGROUND OF THE INVENTION

Magnetic coating compositions containing ferromagnetic metal powder and/or ferromagnetic alloy powder, which are to be used in the production of magnetic recording materials, are usually prepared by fully dispersing such magnetic materials and polymeric binders along with suitable organic solvents by means of a dispersing machine, e.g., a ball mill and a sand mill. If necessary, other materials may be added such as antistatic agents, lubricants, abrasives, hardeners, and so forth. The degree of dispersion of the magnetic coating composition is closely related to or responsible for the surface smoothness, orientation ratio, and so forth of the magnetic recording material produced therefrom. Further, it is the most important factor relating to the electromagnetic transforming characteristics of the magnetic recording material. Therefore, in order to produce magnetic coating compositions having much higher degree of dispersion, it is quite important to select suitable combinations of magnetic materials and polymeric binders.

Furthermore, the durability of the magnetic recording material varies greatly with the combination of magnetic material and polymeric binders. Thus, also from a viewpoint of durability, it is very important to select suitable combinations of magnetic materials and polymeric binders.

Heretofore, as such polymeric binders, vinyl chloride/vinyl acetate-based copolymers, polybutyral resins, phenoxy resins, thermoplastic polyurethane resins, acrylonitrile/butadiene-based copolymers, synthetic rubbers, etc. have been used alone or in combination with each other.

When, however, these polymeric binders are used in the preparation of magnetic coating compositions containing ferromagnetic metal powder or ferromagnetic alloy powder, such metal type magnetic materials are insufficiently dispersed in the polymeric binders. This is because metal type magnetic materials have very poor dispersibility compared with other oxide type magnetic materials. Thus, magnetic recording materials produced from these metal type magnetic coating compositions have disadvantages in that the surface properties are poor and the orientation ratio is low.

On the other hand, magnetic coating compositions using conventional oxide type magnetic materials and nitrocelluloses, e.g., HIG½ and RS½ are described in Japanese Patent Publication Nos. 48,003/77, 48,004/77, 4,122/75, 48,126/74, 46,921/74 and 46,921/72, and Japanese Patent Application (OPI)Nos. 43,405/77, 44,904/76 and 67,605/75. These magnetic coating compositions are superior particularly in dispersion characteristics. However, when the metal type magnetic materials are used in place of such oxide type magnetic materials, the resulting magnetic coating compositions are seriously increased in viscosity or become gel, as reported in Japanese Patent Publication No. 22,063/72. The increase in viscosity is caused by the surface activity of the metal type magnetic materials being completely different from those of the conventional oxide type magnetic materials. Accordingly, it is not possible to obtain a product in a liquid paint form.

SUMMARY OF THE INVENTION

The present inventors have carried out extensive investigations to produce magnetic coating compositions for use in the production of metal type magnetic recording materials (i.e., containing ferromagnetic metal powder or ferromagnetic alloy powder). As a result of these investigation the inventors have found that the use of nitrocellulose having a low degree of polymerization as one of polymeric binders produces magnetic coating compositions capable of producing the metal type magnetic recording materials having greatly superior dispersibility and durability.

An object of the present invention is to produce magnetic coating compositions capable of producing magnetic recording materials containing ferromagnetic metal powder or ferromagnetic alloy powder and having excellent dispersibility of the powder and durability.

The present invention, in one embodiment, relates to magnetic coating compositions for use in the production of magnetic recording materials, comprising at least ferromagnetic metal powder and/or ferromagnetic alloy powder, and nitrocellulose having an average degree of polymerization of from 10 to 55.

In another embodiment, the present invention relates to magnetic coating compositions for use in the production of magnetic recording materials, comprising at least ferromagnetic metal powder and/or ferromagnetic alloy powder, nitrocellulose having an average degree of polymerization of from 10 to 55, and at least one polymeric binder.

DETAILED DESCRIPTION OF THE INVENTION

The term "ferromagnetic metal powder or ferromagnetic alloy powder" is used herein to mean needle-like fine powders of iron, alloys composed mainly of iron or nickel. The alloys comprised mainly of iron or nickel used in the present invention contain at least 50% by weight, preferably 70% by weight or more, of iron or nickel. These needle-like fine powders can be produced by various techniques, typical ones of which are shown below:

(1) Organic acid salts of ferromagnetic metal are decomposed by heating and then, reduced with reducing gases;

(2) Needle-like oxyhydroxides with or without other metals incorporated thereinto, or needle-like oxides produced from the needle-like oxyhydroxides are reduced;

(3) Ferromagnetic metals are vaporized in low pressure inert gases;

(4) Metal carbonyl compounds are thermally decomposed;

(5) Ferromagnetic powder is electrically deposited by the use of a mercury cathode, and then separated from the mercury;

(6) A solution of ferromagnetic metal salts are reduced by adding a reducing agent thereto.

The ferromagnetic metal powder or ferromagnetic alloy powder as used herein is not limited to specific ones. Examples of the powders include iron, an iron-cobalt alloy, an iron-nickel alloy, an iron-cobalt-nickel alloy, and a nickel-cobalt-phosphorus alloy. The powders have preferably an axis ratio of from 5/1 to 15/1 and a long axis of from about 0.2 to about 0.8 μm, can be used.

The nitrocellulose as used herein is nitrocellulose having an average degree of polymerization of from 10 to 55, which is produced by nitration of a cellulose material, e.g., cotton linter and wood pulp, in known procedures to form nitrocellulose, and then, heating the thus-formed nitrocellulose along with water in an autoclave. Considering durability, it is preferred to use nitrocellulose having an average degree of polymerization of from 31 to 55. The heating time and temperature in the autoclave are determined depending on the degree of polymerization of the crude nitrocellulose used. Nitrocellulose having an average degree of polymerization of less than 10 has disadvantages in that the dispersion stability of the resulting composition is poor and the ferromagnetic metal powder or ferromagnetic alloy powder precipitates in the composition, and the resulting magnetic recording material has poor durability. On the other hand, when the average degree of polymerization is more than 55, the resulting coating composition has only poor dispersibility and can provide only a magnetic recording material which is quite insufficient with respect to its surface smoothness and orientation ratio.

The amount of the nitrocellulose used is from 1 to 30% by weight, preferably from 5 to 20% by weight, based on the weight of the ferromagnetic metal powder and/or ferromagnetic alloy powder. When the amount is less than 1% by weight, the resulting composition has only poor dispersibility, and it can therefore provide only a magnetic recording material which is not satisfactory with respect to its surface properties and orientation ratio. On the other hand, when the amount is larger than 30% by weight, although the dispersibility of the resulting composition are good, the density of a magnetic recording material produced from the composition is excessively decreased, resulting in a reduction in recording density.

The average degree of polymerization as used herein is measured as follows:

A necessary amount (as determined so that $\eta sp$ is from 0.1 to 0.2) of nitrocellulose is accurately weighed in a 200-ml Elmenmeyer flask with a stopper, and 50 ml of a special grade acetone (defined by JIS-K3034) maintained at 20±0.1° C. was added thereto. After allowed to stand for about 16 hours, the resulting solution was gently shaken for 5 minutes to obtain a sample solution. The flask was soaked in water maintained at 20±0.1° C., and allowed to stand for at least 20 minutes. A 5-ml portion is sampled, placed in an Ostwald viscometer, allowed to stand at 20±0.1° C. for at least 20 minutes, and thereafter, the speed at which the sample solution flows down from Point A(upper line) to Point B(lower line) in a fine tube of the viscometer is measured. Separately, the time required for acetone to flow down from Point A to Point B is measured in the same manner as used in measuring the speed of the sample solution. On basis of the thus-obtained values, the degree of polymerization is calculated by the following equations (1), (2), and (3):

$$\eta sp = \frac{t}{t_0} - 1 \qquad (1)$$

where
$\eta sp$: specific viscosity
$t$: time required for sample solution to fall down (sec.)
$t_0$: time required for acetone to fall down (sec.)

$$[\eta] = \frac{\eta sp/C}{1 + K'\eta sp} \qquad (2)$$

where
$[\eta]$: intrinsic viscosity
C: concentration of sample (g/l)
K': 0.315

$$DP = \frac{[\eta]}{Km} \qquad (3)$$

where
DP: average degree of polymerization
Km: $11 \times 10^{-4}$

Any polymeric binders conventionally used in the preparation of magnetic coating compositions for magnetic recording materials can be used with the nitrocellulose in the invention. Examples include vinyl chloride/vinyl acetate-based copolymers, vinyl chloride/vinylidene chloride-based copolymers, vinyl chloride/acrylonitrile-based copolymers, acrylic acid ester/acrylonitrile-based copolymers, acrylic acid ester/vinylidene chloride-based copolymers, acrylic acid ester/styrene-based copolymers, methacrylic acid ester/acrylonitrile-based copolymers, methacrylic acid ester/vinylidene chloride-based copolymers, methacrylic acid ester/styrene-based copolymers, polyurethane elastomers, polyvinyl fluoride, vinylidene chloride/acrylonitrile-based copolymers, butadiene/acrylonitrile-based copolymers, polyamide resins, polyvinyl butyral, cellulose acetate butyrate, cellulose acetate, cellulose acetate isobutyrate, cellulose acetate propionate, ethyl cellulose, polyester resins, styrene/butadiene-based copolymers, various synthetic rubber-based thermoplastic resins (e.g., polybutadiene, polychloroprene, and polyisoprene), modified natural rubbers (e.g., chlorinated rubber and cyclized rubber), and modified polyolefins (e.g., chlorinated polyethylene and chlorinated polypropylene). These polymers can be used alone or in combination with each other.

The polymeric binder should be added in an amount of not more than 30 times (by weight) based on the weight of the nitrocellulose. Preferably the polymeric binder is added in an amount from equal to to 10 times the amount of the nitrocellulose. When the amount of the polymeric binder added exceeds 30 times (by weight) of the nitrocellulose, the dispersibility of the ferromagnetic metal powder or ferromagnetic alloy powder decreases, providing a magnetic recording material which is insufficient with respect to its surface properties and compounding properties.

These polymeric binders may be added after dispersing the nitrocellulose and the magnetic material in an organic solvent as a medium, or may be added along with the nitrocellulose in dispersing the magnetic material. The use of these polymeric binders in combination with the abovedescribed nitrocellulose improves, in particular, the durability of a magnetic recording material produced from the resulting magnetic coating composition.

In addition, if necessary, antistatic agents, lubricants, abrasives, dispersing agents, hardening agents, and so forth can be added to the magnetic coating compositions of the invention. Usually, carbon black is used as an anti-static agent; high molecular weight alcohol esters such as butyl myristate, and silicone oils are used as lubricants; chromium dioxide and alumina are used as abrasives; and lecithin and surface active agents are used as dispersing agents. Examples of useful hardening agents include a tolylene diisocyanate/trimethylolpropane adduct, which is most preferred. Other useful hardening agents include a hexamethylene diisocyanate/trimethylolpropane adduct, a hexamethylene diisocyanate/water adduct, an isophorone diisocyanate/trimethylolpropane adduct, and their isocyanurated products.

The above-described additives are preferably added (with the total weight of the ferromagnetic metal powder and/or ferromagnetic alloy powder as 100) in an amount of from 2 to 10 for the antistatic agent, from 1 to 5 for the lubricant, from 1 to 5 for the abrasive, and from 0.5 to 2.5 for the dispersing agent. If the additives are included in lesser amounts than the above-defined ranges, the effect of each additive is insufficient, whereas in larger amounts than the ranges the durability of the resulting coating film is poor.

The amount of the hardening agent added is determined depending on the types and amounts of the nitrocellulose and polymeric binder used. Preferably the hardening agent is added so that the NCO content of the hardening agent is from 0.2 to 1.0 mole per mole of the total OH content of the nitrocellulose and the polymeric binder(s) used in combination therewith. When the NCO content of the hardening agent is less than 0.2 mole, the crosslink density is not sufficiently high, leading to the production of a magnetic recording material having poor durability. On the other hand, when it is more than 1.0 mole, the unreacted hardening agent remains in the resulting magnetic coating film, causing problems such as a reduction in the running properties of the ultimate magnetic recording material (e.g., a magnetic tape) and the contamination of a head.

The use of the above-described additives makes the invention more useful.

Typical methods of preparing the magnetic coating compositions of the invention will hereinafter be explained.

(1) Ferromagnetic metal powder and/or ferromagnetic alloy powder and the nitrocellulose are mixed and dispersed for from 1 to 72 hours in the presence of a suitable organic solvent (for example, acetic acid esters such as methyl acetate, ethyl acetate and butyl acetate, ketones such as acetone, methyl ethyl ketone (MEK), methyl isobutyl ketone (MIBK) and cyclohexanone, tetrahydrofuran, N,N'-dimethylformamide, toluene, xylene, cyclohexane, and n-hexane) by means of a dispersing machine such as a ball mill, a sand mill and an attritor. Further, a polymeric binder, an antistatic agent, a lubricant, an abrasive, a hardening agent, etc. are added, and the resulting mixture is further mixed for from 1 to 10 hours to prepare the desired magnetic coating composition.

(2) Ferromagnetic metal powder and/or ferromagnetic alloy powder, the nitrocellulose, a polymeric binder, an antistatic agent, a lubricant, an abrasive, etc. are mixed and dispersed for from 1 to 72 hours in the presence of a suitable organic solvent by means of a dispersing machine such as a ball mill, a sand mill and an attritor. Then, a hardening agent is added, and the resulting mixture is further mixed for from 1 to 10 hours to prepare the desired coating composition.

(3) Ferromagnetic metal powder and/or ferromagnetic alloy powder and the nitrocellulose are preliminarily kneaded in the presence of a suitable organic solvent by means of a kneading machine such as a kneader and a disper and, thereafter, the resulting mixture is processed in the same manner as in the preparation of conventional magnetic coating compositions, to prepare the desired coating composition.

(4) Ferromagnetic metal powder and/or ferromagnetic alloy powder, the nitrocellulose and a polymeric binder are dispersed in the presence of an organic solvent by means of a dispersing machine such as a ball mill, and then, an antistatic agent, a lubricant, a hardening agent, etc. are added and mixed to prepare the desired coating composition.

Of these methods, Method (3) is preferred, in which ferromagnetic metal powder and/or ferromagnetic metal powder and the nitrocellulose are preliminarily kneaded in the presence of an organic solvent, and then, a polymeric binder, a lubricant, a hardening agent, etc. are added and dispersed to prepare the composition of the invention.

The following examples are given to illustrate the invention in greater detail.

Preparation of Nitrocellulose

Nitrocellulose HE 2000 (produced by Asahi Kasei Kogyo Kabushiki Kaisha: average degree of polymerization: 900; ethyl alcohol content: 30%) was added to 10 volumes of water, fully stirred, and then, dehydrated by a centrifugal separator. This procedure was repeated five times, and then, 5 volumes of water was added. The resulting mixture was heated at 140° C. for 100 minutes, 120 minutes, 160 minutes, 200 minutes, 240 minutes and 350 minutes, respectively, to prepare six kinds of nitrocelluloses. The average degrees of polymerization of these nitrocelluloses were measured with the results shown in Table 1.

These nitrocelluloses are designated as Nitrocelluloses A to F as described in Table 1.

TABLE 1

| Treating Time in Autoclave (min.) | Average Degree of Polymerization | Nitrocellulose |
|---|---|---|
| 100 | 52 | A |
| 120 | 45 | B |
| 160 | 32 | C |
| 200 | 22 | D |
| 240 | 13 | E |
| 350 | 8 | F |

EXAMPLE 1

| | Amount (parts by weight) |
|---|---|
| Ferromagnetic metal powder (produced by Toda Kogyo Co., Ltd.; trade name: KM-1000) | 110 |
| Nitrocellulose A (average degree of polymerization: 52) | 10 |
| Thermoplastic polyurethane resin (produced by B. F. Goodrich Corp.; trade Name: | 20 |

|  | Amount (parts by weight) |
|---|---|
| Estane 5703) | |
| MEK | 100 |
| MIBK | 100 |

These ingredients were dispersed in a stainless steel ball mill for 72 hours. Then, 1 part by weight of carbon black as an antistatic agent, 0.3 part by weight of butyl myristate as a lubricant, and 3 parts by weight of Colonate L (trade name; produced by Nippon Polyurethane Co., Ltd.) as a hardening agent were added, and the resulting mixture was further mixed for 1 hour to prepare a magnetic coating composition. The magnetic coating composition was evaluated by the methods as described hereinafter. The results are shown in Table 2.

Surface Smoothness

A magnetic coating composition was coated on a polished glass plate having a smooth surface in a wet thickness of 254 μm by means of a Baker applicator. The thus-formed coating film was then preliminarily dried at room temperature for 30 minutes and then hardened by heating at 80° C. for 24 hours. Thereafter, the 60°/60° specular glossiness of the coating film was measured by the use of a digital varied-angle glossmeter (manufactured by Suga Shikenki Co., Ltd.). The results are shown in Table 2, in which the values are shown with the glossiness of the standard black plate as 91.5. Higher surface glossiness shows higher surface smoothness.

Orientation Ratio

A magnetic coating composition was coated on a 15 μm thick polyester film in a dry thickness of about 5 μm and, before drying, was passed through a repulsive magnetic field to orientate the magnetic material contained in the magnetic coating film. Then, the coating film was hardened by heating at 80° C. for 24 hours, and cut to a 1 inch square sample piece. With this sample piece, the squareness ratios in the direction of orientation, and in a direction perpendicular to the orientation direction were measured by a B-H curve tracer (produced by Riken Denshi Co., Ltd.), and the orientation ratio was determined by the following equation:

Orientation ratio=(Squareness ratio in orientation direction)/(Squareness ratio in perpendicular direction)

Dispersion Stability

A magnetic coating composition was placed in a precipitating tube made of glass having a diameter of 10 mm and a length of 300 mm and was allowed to stand in an atmosphere of 20±0.1° C. and 65±3% RH for 48 hours, and the condition of the composition was observed with the naked eye. The criteria for the determination were as follows:
A: Precipitation and separation of ferromagnetic metal powder and/or ferromagnetic alloy powder were not observed.
B: Separation was observed.

Durability

A magnetic coating composition was coated on a 15 μm thick polyester film in a dry thickness of about 5 μm and, before drying, was passed through a repulsive magnetic field to orientate the magnetic material in the magnetic coating composition. The resulting film was preliminarily dried at room temperature for 24 hours, subjected to calendering, hardened by heating at 60° C. for 48 hours, and cut to a 1-inch width to produce a test tape. This test tape was mounted on a commercially available video tape recorder and the still mode reproduction was performed for 60 minutes. At the end of the time, the condition of the tape surface was examined with the naked eye and under an optical microscope. The criteria for the determination were as follows:
A: No changes were observed.
B: Some scratches were observed.
C: The magnetic layer was completely removed.

EXAMPLE 2

A magnetic coating composition was prepared in the same manner as in Example 1 except that Nitrocellulose B (average degree of polymerization: 45) was used in place of Nitrocellulose A, and its performance was evaluated. The results are shown in Table 2.

EXAMPLE 3

A magnetic coating composition was prepared in the same manner as in Example 1 except that Nitrocellulose C (average degree of polymerization: 32) was used in place of Nitrocellulose A, and its performance was evaluated. The results are shown in Table 2.

EXAMPLE 4

A magnetic coating composition was prepared in the same manner as in Example 1 except that Nitrocellulose D (average degree of polymerization: 22) was used in place of Nitrocellulose A, and its performance was evaluated. The results are shown in Table 2.

EXAMPLE 5

A magnetic coating composition was prepared in the same manner as in Example 1 except that Nitrocellulose E (average degree of polymerization: 13) was used in place of Nitrocellulose A, and its performance was evaluated. The results are shown in Table 2.

COMPARATIVE EXAMPLE 1

A magnetic coating composition was prepared in the same manner as in Example 1 except that Nitrocellulose HIG½ (average degree of polymerization: 90; produced by Asahi Kasei Kogyo Kabushiki Kaisha) was used in place of Nitrocellulose A, and its performance was evaluated. The results are shown in Table 2.

COMPARATIVE EXAMPLE 2

A magnetic coating composition was prepared in the same manner as in Example 1 except that Nitrocellulose HIG¼ (average degree of polymerization: 65; produced by Asahi Kasei Kogyo Kabushiki Kaisha) was used in place of Nitrocellulose A, and its performance was evaluated. The results are shown in Table 2.

COMPARATIVE EXAMPLE 3

A magnetic coating composition was prepared in the same manner as in Example 1 except that Nitrocellulose F (average degree of polymerization: 8) was used in place of Nitrocellulose A, and its performance was evaluated. The results are shown in Table 2.

COMPARATIVE EXAMPLE 4

A magnetic coating composition was prepared in the same manner as in Example 1 except that a vinyl chloride/vinyl acetate copolymer (VAGH, produced by Union Carbide Corp.) was used in place of Nitrocellulose A, and its performance was evaluated. The results are shown in Table 2.

EXAMPLE 6

| | Amount (parts by weight) |
|---|---|
| KM-1000 | 110 |
| Nitrocellulose C | 20 |
| Estane 5703 | 10 |
| MEK | 100 |
| MIBK | 100 |

These ingredients were mixed and dispersed in a stainless steel ball mill for 72 hours. Using the thus-formed dispersion, a magnetic coating composition was prepared in the same manner as in Example 1, and its performance was evaluated. The results are shown in Table 2.

EXAMPLE 7

| | Amount (parts by weight) |
|---|---|
| KM-1000 | 110 |
| Nitrocellulose C | 10 |
| MEK | 50 |
| MIBK | 100 |

These ingredients were mixed and dispersed in a stainless steel ball mill for 72 hours. Then, 30 parts by weight of Estane 5703, 50 parts by weight of MEK, 1 part by weight of carbon black, 0.3 part by weight of butyl myristate, and 3 parts by weight of Colonate L were added, and the resulting mixture was further mixed to prepare a magnetic coating composition. The performance of the magnetic coating composition was evaluated in the same manner as in Example 1. The results are shown in Table 2.

EXAMPLE 8

| | Amount (parts by weight) |
|---|---|
| KM-1000 | 110 |
| Nitrocellulose C | 3 |
| MEK | 50 |
| MIBK | 50 |

These ingredients were mixed and preliminarily kneaded in a kneader (Σ blade type) for 4 hours. Then, the following ingredients were added thereto.

| | Amount (parts by weight) |
|---|---|
| Nitrocellulose C | 7 |
| Estane 5703 | 20 |
| MEK | 50 |
| MIBK | 50 |

The resulting mixture was kneaded in a stainless steel ball mill for 68 hours. Using the thus-kneaded mixture, a magnetic coating composition was produced in the same manner as in Example 1, and its performance was evaluated. The results are shown in Table 2.

EXAMPLE 9

A magnetic coating composition was prepared in the same manner as in Example 6 except that the amounts of the Nitrocellulose C and Estane 5703 added were changed from 20 parts by weight to 27 parts by weight and from 10 parts by weight to 3 parts by weight, respectively. The performance of the magnetic coating composition was evaluated. The results are shown in Table 2.

EXAMPLE 10

A magnetic coating composition was prepared in the same manner as in Example 6 except that the amounts of the Nitrocellulose C and Estane 5703 added were changed from 20 parts by weight to 6 parts by weight and from 10 parts by weight to 24 parts by weight, respectively. The performance of the magnetic coating composition was evaluated. The results are shown in Table 2.

TABLE 2

| Example No. | Surface Glossiness | Orientation Ratio | Dispersion Stability | Durability | Total Evaluation* |
|---|---|---|---|---|---|
| 1 | 45 | 1.45 | A | A | B |
| 2 | 55 | 1.65 | A | A | A |
| 3 | 60 | 1.70 | A | A | A |
| 4 | 66 | 1.75 | A | B | B |
| 5 | 60 | 1.75 | A | B | B |
| 6 | 65 | 1.80 | A | A | A |
| 7 | 63 | 1.75 | A | A | A |
| 8 | 68 | 1.80 | A | A | A |
| 9 | 68 | 1.80 | A | B | B |
| 10 | 47 | 1.62 | A | A | B |
| Comparative Example | | | | | |
| 1 | 15 | 1.15 | B | C | C |
| 2 | 27 | 1.27 | B | B | C |
| 3 | 55 | 1.60 | B | C | C |
| 4 | 22 | 1.20 | B | A | C |

*Note [Total Evaluation]
A — Excellent
B — Good
C — Not Good

It can be seen from Table 2 that the magnetic coating compositions of the invention are much superior with respect to their dispersibility as compared with conventional compositions prepared using synthetic resins such as a vinyl chloride/vinyl acetate copolymer (Comparative Example 4), and nitrocellulose having a degree of polymerization outside the range of 10 to 55 (Comparative Examples 1-3). The composition of the invention can provide magnetic recording materials which have excellent surface smoothness and orientation ratio, and further, excellent durability. Thus, the magnetic coating compositions of the invention are very useful in the production of video tapes and audio tapes.

While the invention has been described in detail and with reference to specific embodiment thereof, it will be apparent to one skilled in the art that various changes and modifications can be made therein without departing from the spirit and scope thereof.

What is claimed is:

1. A magnetic coating composition, comprising:

a metal powder selected from the group consisting of a ferromagnetic metal powder and a ferromagnetic alloy powder containing at least 50% by weight iron or nickel, and
1 to 30% by weight based on the total weight of the metal powder of a nitrocellulose having an average degree of polymerization of from 10 to 55.

2. A magnetic coating composition as claimed in claim 1, wherein the nitrocellulose has an average degree of polymerization of from 31 to 55.

3. A magnetic coating composition as claimed in claim 1, further comprising a polymeric binder in an amount of not more than 30 times the weight of the nitrocellulose.

4. A magnetic coating composition as claimed in claim 3, wherein the nitrocellulose has an average degree of polymerization of from 31 to 55.

5. A magnetic coating composition as claimed in claim 1, wherein the nitrocellulose is present in an amount of 5 to 20% by weight based on the total weight of the metal powder.

6. A magnetic coating composition as claimed in claim 3, wherein the nitrocellulose is present in an amount of 5 to 20% by weight based on the total weight of the metal powder.

7. A magnetic coating composition as claimed in claim 1, further comprising an antistatic agent present in an amount of 2 to 10 parts by weight per 100 parts by weight of the metal powder.

8. A magnetic coating composition as claimed in claim 1, further comprising a lubricant present in an amount of 1 to 5 parts by weight per 100 parts by weight of the metal powder.

9. A magnetic coating composition as claimed in claim 1, further comprising an abrasive present in an amount of 1 to 5 parts by weight per 100 parts by weight of the metal powder.

10. A magnetic coating composition as claimed in claim 1, further comprising a dispersing agent present in an amount of 0.5 to 2.5 parts by weight per 100 parts by weight of the metal powder.

* * * * *